US010462438B2

(12) United States Patent
Mizuno et al.

(10) Patent No.: US 10,462,438 B2
(45) Date of Patent: Oct. 29, 2019

(54) DISPLAY APPARATUS, DISPLAY SYSTEM, AND METHOD FOR CONTROLLING DISPLAY APPARATUS THAT IS CONFIGURED TO CHANGE A SET PERIOD

(71) Applicant: SEIKO EPSON CORPORATION, Tokyo (JP)

(72) Inventors: Kengo Mizuno, Azumino (JP); Takahiro Ano, Matsumoto (JP); Kazuyoshi Kitabayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/928,373

(22) Filed: Mar. 22, 2018

(65) Prior Publication Data

US 2018/0288378 A1 Oct. 4, 2018

(30) Foreign Application Priority Data

Mar. 28, 2017 (JP) ................. 2017-062390

(51) Int. Cl.
*H04N 5/06* (2006.01)
*H04N 5/63* (2006.01)
*H04N 9/31* (2006.01)

(52) U.S. Cl.
CPC ............ *H04N 9/3179* (2013.01); *H04N 5/06* (2013.01); *H04N 9/3147* (2013.01); *H04N 5/63* (2013.01)

(58) Field of Classification Search
CPC ..................... H04N 5/23203; H04N 13/282
See application file for complete search history.

(56) References Cited

U.S. PATENT DOCUMENTS

| 5,526,024 A * | 6/1996 | Gaglianello | G06F 3/14 |
| | | | 345/2.2 |
| 5,671,010 A * | 9/1997 | Shimbo | G04F 13/02 |
| | | | 348/157 |
| 8,264,421 B2 | 9/2012 | Yamada et al. | |
| 8,403,506 B2 | 3/2013 | Suzuki | |
| 8,436,786 B2 * | 5/2013 | Kamoto | G06F 3/1446 |
| | | | 345/1.1 |
| 9,128,358 B2 | 9/2015 | Kubota | |
| 9,619,197 B2 * | 4/2017 | Bang | G06F 3/1431 |
| 2005/0111701 A1 * | 5/2005 | Seki | G08B 13/19645 |
| | | | 382/107 |
| 2005/0157272 A1 * | 7/2005 | Childers | G09G 3/007 |
| | | | 353/84 |

(Continued)

FOREIGN PATENT DOCUMENTS

| JP | H09-185351 A | 7/1997 |
| JP | 2005-250445 A | 9/2005 |

(Continued)

*Primary Examiner* — Paulos M Natnael
(74) *Attorney, Agent, or Firm* — Oliff PLC (57) ABSTRACT

A display apparatus includes a storage that stores a set period that is a period from the point of time when electric power supply starts to the point of time when a projection section starts displaying an image, a remote control that accepts operation, and a controller that changes the set period based on the operation accepted by the remote control, and the controller causes the projection section to start projecting the image after the electric power supply starts and the set period then elapses.

13 Claims, 6 Drawing Sheets

(56) References Cited

U.S. PATENT DOCUMENTS

| | | | | |
|---|---|---|---|---|
| 2005/0168630 A1* | 8/2005 | Yamada | H04N 5/0736 | 348/383 |
| 2005/0280601 A1* | 12/2005 | Fukue | G06F 3/1431 | 345/1.1 |
| 2007/0018888 A1* | 1/2007 | Fujikawa | G01S 7/04 | 342/185 |
| 2007/0164687 A1* | 7/2007 | Watanabe | H04N 9/3114 | 315/291 |
| 2007/0170037 A1* | 7/2007 | Kuroda | B66B 5/0012 | 198/322 |
| 2011/0066259 A1 | 3/2011 | Suzuki | | |
| 2012/0139822 A1* | 6/2012 | Shiroto | G09G 3/3406 | 345/102 |
| 2012/0194656 A1* | 8/2012 | Killian | H04N 13/341 | 348/56 |
| 2012/0249502 A1* | 10/2012 | Takahashi | G09G 3/3677 | 345/205 |
| 2013/0106836 A1* | 5/2013 | Kim, II | G09G 3/34 | 345/419 |
| 2013/0250251 A1* | 9/2013 | Kubota | G03B 21/14 | 353/57 |
| 2014/0219698 A1* | 8/2014 | Ishizuka | G05B 19/0421 | 400/578 |
| 2015/0049309 A1* | 2/2015 | Sumiyoshi | G03B 21/26 | 353/31 |
| 2016/0091217 A1* | 3/2016 | Verberkt | G06F 8/654 | 700/276 |
| 2017/0061930 A1* | 3/2017 | Iuchi | G06F 3/1446 | |
| 2017/0344330 A1* | 11/2017 | Masumoto | G06F 3/1446 | |
| 2018/0141484 A1* | 5/2018 | Haneda | B60Q 1/26 | |
| 2018/0170202 A1* | 6/2018 | Kim | B60L 11/1838 | |
| 2018/0204381 A1* | 7/2018 | Kanatsu | H04N 13/282 | |
| 2018/0288378 A1* | 10/2018 | Mizuno | H04N 9/3179 | |

FOREIGN PATENT DOCUMENTS

| | | |
|---|---|---|
| JP | 2009-284055 A | 12/2009 |
| JP | 2013-225103 A | 10/2013 |
| JP | 5434418 B2 | 3/2014 |
| JP | 2014-145921 A | 8/2014 |
| JP | 2014-154897 A | 8/2014 |

\* cited by examiner

SETTING TABLE 153A

| SETTING | SET PERIOD |
|---|---|
| SETTING 1 | 5000ms |
| SETTING 2 | 6000ms |
| SETTING 3 | 7000ms |
| SETTING 4 | 8000ms |
| SETTING 5 | 9000ms |
| SETTING 6 | 10000ms |
| SETTING 7 | 11000ms |
| SETTING 8 | 12000ms |
| SETTING 9 | 13000ms |
| SETTING 10 | 14000ms |
| SETTING 11 | 15000ms |

DISPLAY APPARATUS, DISPLAY SYSTEM, AND METHOD FOR CONTROLLING DISPLAY APPARATUS THAT IS CONFIGURED TO CHANGE A SET PERIOD

CROSS-REFERENCE

The entire disclosure of Japanese Patent Application No. 2017-062390, filed Mar. 28, 2017 is expressly incorporated by reference herein.

BACKGROUND

1. Technical Field

The present invention relates to a display apparatus, a display system, and a method for controlling the display apparatus.

2. Related Art

There has been a known display system that causes a plurality of display apparatus to display images in such a way that the images as a whole form a single image displayed on a display surface. To allow images as a whole to form a single image displayed on the display surface, the timings when the display apparatus display images need to be synchronized with one another (see JP-A-2005-250445, for example).

JP-A-2005-250445 discloses a timing server that produces a display instruction packet as a synchronization signal representing a display instruction and broadcasts the display instruction packet to other apparatus connected to a network.

To synchronize timings when the images displayed by the display apparatus are reproduced with one another, it is necessary to separately provide an upper-level apparatus that manages the timings when the display apparatus start reproducing the images, such as the timing server disclosed in JP-A-2005-250445. As a result, the display system undesirably has a large-scale configuration.

SUMMARY

An advantage of some aspects of the invention is to adjust image display timings in a simple configuration.

An aspect of the invention is directed to a display apparatus including a display section that displays an image, an input section to which an instruction for displaying the image is inputted, a storage that stores a set period that is a period from a point of time when the instruction is inputted to the input section to a point of time when the display section displays the image, an operation accepting section that accepts operation, a changing section that changes the set period based on the operation accepted by the operation accepting section, and a controller that causes the display section to display the image after the instruction is inputted to the input section and the set period stored in the storage then elapses.

According to the aspect of the invention, the display apparatus displays the image after the instruction is inputted to the input section and the set period then elapses. The timing when the display apparatus displays the image can therefore be set with respect to the timing when the instruction is inputted to the input section. For example, to cause a plurality of display apparatus to display images, setting the same set period in the plurality of display apparatus and adjusting the timing when the instruction is inputted to each of the plurality of display apparatus allow the timings when the plurality of display apparatus display images to coincide with one another. The image display timings can therefore be adjusted in the simple configuration.

In the aspect of the invention, the controller may cause the display section to display a preset image after the instruction is inputted to the input section but before the set period elapses.

According to the aspect of the invention with this configuration, the preset image can be displayed until the set period elapses. Since the preset image is displayed until display apparatus starts displaying the image, a user can be notified that the display apparatus has not started projecting the image.

In the aspect of the invention, the controller may cause an image showing a period remaining until the display section displays the image to be displayed as the preset image.

According to the aspect of the invention with this configuration, since the image showing the remaining period is displayed as the preset image, the user can recognize the period remaining until the display apparatus starts displaying the image.

In the aspect of the invention, the controller may cause the display section to display an image showing the set period when the operation accepting section accepts the operation.

According to the aspect of the invention with this configuration, the operation accepted by the operation accepting section allows the image showing the set period to be displayed. The user can therefore recognize the set period having been set.

In the aspect of the invention, the controller may cause the display section to display an image showing that the image cannot be displayed in a case where the display section fails in displaying the image after the set period elapses.

According to the aspect of the invention with this configuration, in the case where the image cannot be displayed, an image showing that the image cannot be displayed is displayed. The user can therefore be notified that the image cannot be displayed.

In the aspect of the invention, the controller may switch a first mode in which the display section displays the image after the instruction is inputted to the input section and the set period then elapses to a second mode in which the display section displays the image when the instruction is inputted to the input section irrespective of whether or not the set period elapses and vice versa, and the controller may cause the display section to display the image in the selected mode.

According to the aspect of the invention with this configuration, in the first mode, the display section is allowed to start displaying the image after the set period elapses, and in the second mode, the display section is allowed to start displaying the image before the set period elapses. Therefore, the first mode, which allows the image display timing to synchronize with those of other projectors, and the second mode, which allows image display to start with no image display timing synchronization, can be switched from one to the other, and the image can be displayed in the selected mode.

Another aspect of the invention is directed to a display system including a first display apparatus and a second display apparatus. The first display apparatus and the second display apparatus each include a display section that displays an image, an input section to which an instruction for displaying the image is inputted, a storage that stores a set period that is a period from a point of time when the instruction is inputted to the input section to a point of time when the display section displays the image, an operation accepting section that accepts operation, a changing section that changes the set period based on the operation accepted by the operation accepting section, and a controller that causes the display section to display the image after the instruction is inputted to the input section and the set period stored in the storage then elapses. A timing when the instruction is inputted to the input section provided in the first display apparatus and a timing when the instruction is inputted to the input section provided in the second display apparatus are so adjusted that a timing when the first display apparatus displays the image and a timing when the second display apparatus displays the image are adjusted.

According to the aspect of the invention, adjusting the timings when the instruction is inputted to the input sections in the first display apparatus and the second display apparatus allows adjustment of the timings when the first display apparatus and the second display apparatus display the images. The image display timings can therefore be adjusted in the simple configuration.

In the aspect of the invention, the first display apparatus and the second display apparatus may be connected to a common power supply line, the power supply line may be provided with a switch that is so turned on and off as to allow and prevent electric power supply, and the instruction may be inputted to the input sections provided in the first display apparatus and the second display apparatus at a timing when the switch is turned on.

According to the aspect of the invention with this configuration, the instruction is inputted to the first display apparatus and the second display apparatus at the timing when the switch is turned on. Turning on the switch therefore allows the instruction to be inputted to the first display apparatus and the second display apparatus to cause the first display apparatus and the second display apparatus to display the images after the set period elapses.

Another aspect of the invention is directed to a method for controlling a display apparatus including a display section that displays an image, an input section to which an instruction for displaying the image is inputted, and a storage that stores a set period that is a period from a point of time when the instruction is inputted to the input section to a point of time when the display section displays the image, the method including changing the set period stored in the storage based on operation accepted by an operation accepting section and causing the display section to display the image after the instruction is inputted to the input section and the set period stored in the storage then elapses.

According to the aspect of the invention, the display apparatus displays the image after the instruction is inputted to the input section and the set period then elapses. The timing when the display apparatus displays the image can therefore be set with respect to the timing when the instruction is inputted to the input section. For example, to cause a plurality of display apparatus to display images, setting the same set period in the plurality of display apparatus and adjusting the timing when the instruction is inputted to each of the plurality of display apparatus allow the timings when the plurality of display apparatus display images to coincide with one another. The image display timings can therefore be adjusted in the simple configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the accompanying drawings.

Figure 1:
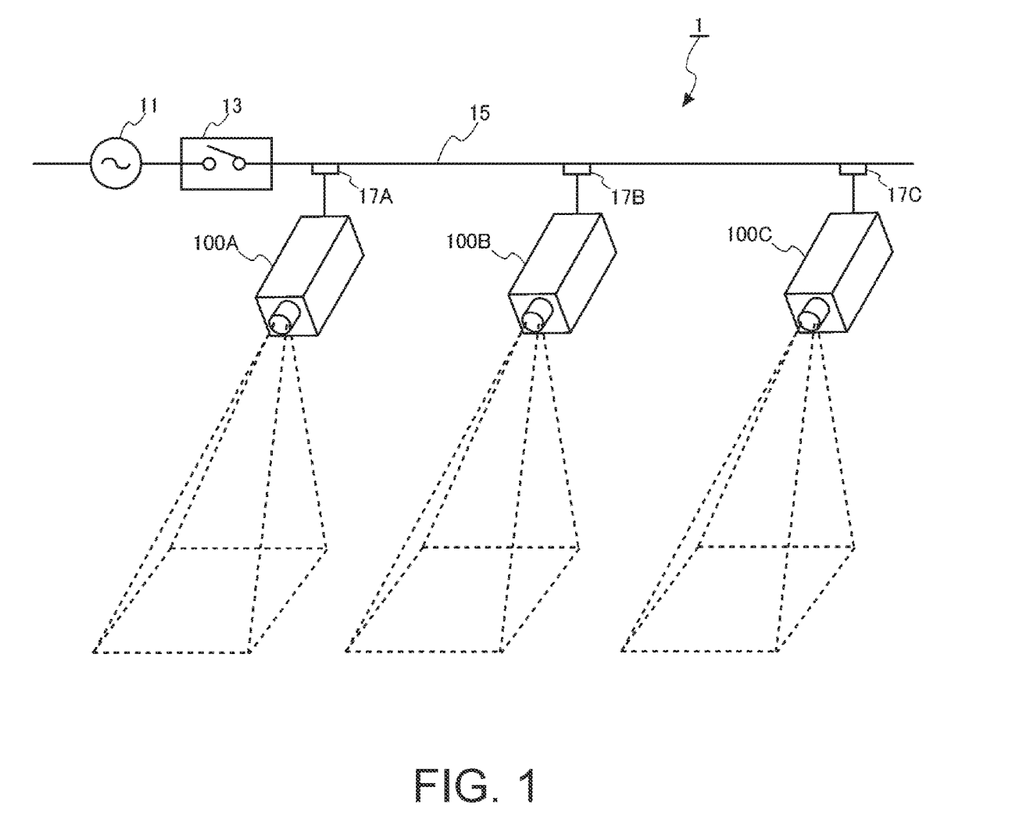
FIG. 1 is a system configuration diagram of a display system.

FIG. 1 is a system configuration diagram of a display system 1 to which the invention is applied.

The display system 1 according to the present embodiment includes a plurality of projectors 100. FIG. 1 shows three projectors 100, projectors 100A, 100B, and 100C, as the plurality of projectors 100. The number of projectors 100 that can configure the display system 1 is not limited to three, and the number of projectors 100 only needs to be at least two. In the following description, the projectors 100A, 100B, and 100C are collectively referred to as projectors 100. The projectors 100A, 100B, and 100C correspond to the "display apparatus," the "first display apparatus," and the "second display apparatus."

The projectors 100A, 100B, and 100C are attached to a duct rail 15 (common power supply line) via connectors 17A, 17B, and 17C, respectively. The duct rail 15 is a rail that supplies the projectors 100 with electric power and is installed on a ceiling surface, a wall surface, a floor surface, or any other surface.

The present embodiment will be described with reference to a case where the duct rail 15 is installed on a wall surface of a room and the projectors 100A, 100B, and 100C connected to the duct rail 15 display images on a ceiling surface, a wall surface, a floor surface, a screen SC, or any other surface of the room. In the following description, the ceiling surface, the wall surface, the floor surface, the screen SC, and other surfaces onto which the projectors 100A, 100B, and 100C project images are collectively called a projection surface.

In the present embodiment, the configuration in which the projectors 100 are connected to the duct rail 15 will be described. The projectors 100 may instead be attached to the ceiling surface or the wall surface via brackets (support tools). The connectors 17A, 17B, and 17C are connection portions that electrically connect the duct rail 15 to the projectors 100A, 100B, and 100C.

The duct rail 15 is connected to a commercial power supply 11 via a power switch 13. The power switch 13 is a manual switch and is installed, for example, on the wall surface. The power switch 13 may be remotely operable by using a remote control 5 or any other device. When the power switch 13 is turned on, the projectors 100A, 100B, and 100C are connected to the commercial power supply 11 in synchronization with the change in the state of the power switch 13 to the turn-on state, and electric power is supplied from the commercial power supply 11 to the projectors 100A, 100B, and 100C.

Figure 2:
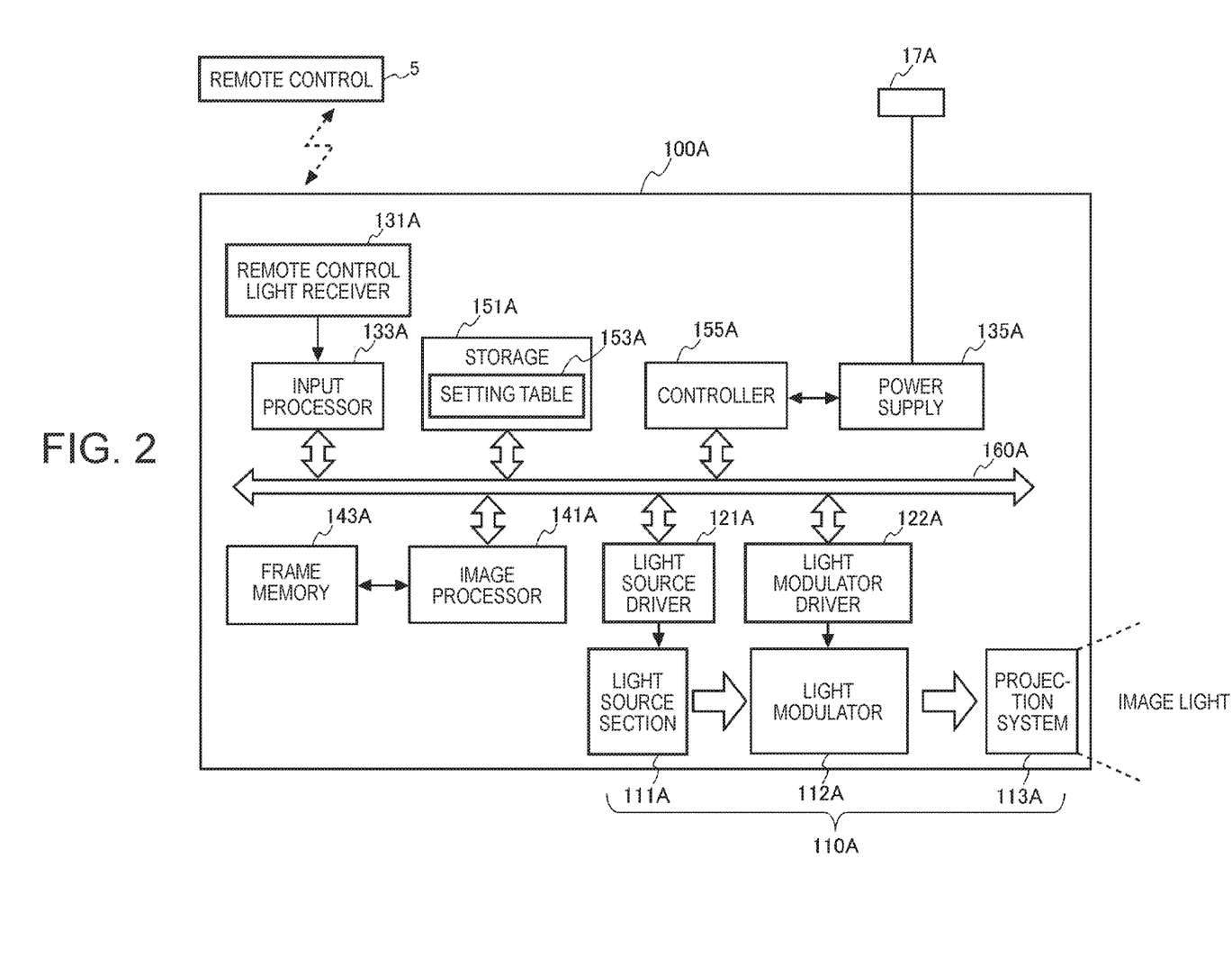
FIG. 2 is a configuration diagram of a projector.

FIG. 2 is a configuration diagram showing the configuration of the projector 100A. The projectors 100A, 100B, and 100C have roughly the same configurations. In the following description, the configuration of the projector 100A will therefore be described as representative of the configurations of the projectors 100A, 100B, and 100C, and the configuration of the projector 100B or 100C will not be described.

The projector 100A includes a projection section 110A, which forms an optical image and projects the formed image light. The projection section 110A includes a light source section 111A, a light modulator 112A, and a projection system 113A. The projection section 110A operates as the "display section" in an aspect of the invention.

The light source section 111A includes a light source formed, for example, of a xenon lamp, an ultrahigh-pressure mercury lamp, an LED (light emitting diode), or a laser light source. The light source section 111A may include a reflector and an auxiliary reflector that guide light emitted by the light source to the light modulator 112A. The light source section 111A may further include a lens group for enhancing the optical characteristics of the projection light, a polarizer, a light adjusting element that that is disposed in the path leading to the light modulator 112A and attenuates the amount of the light emitted by the light source, or any other component (none of the components described above is shown).

The light source section 111A is driven by a light source driver 121A. The light source driver 121A is connected to a bus 160A and switches the turn-on state and the turn-off state of the light source in the light source section 111A from one to the other under the control of a controller 155A, which is also connected to the bus 160A.

The light modulator 112A includes, for example, three liquid crystal panels corresponding to the RGB three primary colors. The light outputted by the light source section 111A is separated into RGB three color light fluxes, which are incident on the corresponding liquid crystal panels. The three liquid crystal panels are each a transmissive liquid crystal panel and modulate light passing therethrough to generate image light. The color light fluxes having been modulated by the liquid crystal panels and having passed therethrough are combined with one another by a light combining system, such as a cross dichroic prism, and the combined light is outputted to the projection system 113A.

The light modulator 112A is driven by a light modulator driver 122A. The light modulator driver 122A is connected to the bus 160A.

The light modulator driver 122A receives, as an input from an image processor 141A, which will be described later, image data sets corresponding to the RGB primary colors. The light modulator driver 122A converts the inputted color image data sets into data signals suitable for the operation of the liquid crystal panels. The light modulator driver 122A applies voltage based on the converted data signals to each pixel of each of the liquid crystal panels to draw an image in the liquid crystal panel.

The projection system 113A includes a lens group that projects the image light modulated by the light modulator 112A on the projection surface to form an image. The projection system 113A may further include a zoom mechanism that enlarges or reduces the image formed by the image light projected on the projection surface and a focus adjustment mechanism that performs focus adjustment.

The projector 100A includes a remote control light receiver 131A and an input processor 133A. The remote control light receiver 131A is connected to the input processor 133A. The input processor 133A, which is connected to the remote control light receiver 131A, is also connected to the bus 160A.

The projector 100A includes a remote control 5 used by a user. The remote control 5 has a variety of buttons and transmits an infrared signal in correspondence with operation performed on any of the buttons.

The remote control light receiver 131A receives the infrared signal transmitted from the remote control 5. The input processor 133A decodes the infrared signal received by the remote control light receiver 131A to produce an operation signal representing the content of the operation performed on the remote control 5 and outputs the operation signal to the controller 155A.

The remote control 5, the remote control light receiver 131A, and the input processor 133A operate as the "operation accepting section" in an aspect of the invention.

The projector 100A includes a power supply 135A. The power supply 135A corresponds to the "input section" in an aspect of the invention.

The power supply 135A is connected to the connector 17A. AC electric power is inputted from the commercial power supply 11 to the power supply 135A via the connector 17A. The AC electric power supplied from the commercial power supply 11 when the power switch 13 is turned on corresponds to the "instruction" in an aspect of the invention.

The power supply 135A converts the supplied AC electric power into DC electric power and supplies each portion of the control system in the projector 100A with low-voltage electric power, such as 3.3-V and 5-V electric power. The power supply 135A supplies the light source section 111A and the light source driver 121A with high-voltage or 12-V electric power. FIG. 2 shows only a power supply line that connects the power supply 135A to the controller 155A, but the power supply 135A is connected to each portion that forms the projector 100A, such as the light source section 111A and the light source driver 121A, and supplies the portions connected to the power supply 135A with electric power.

The present embodiment will be described with reference to the case where the instruction is the AC electric power inputted from the commercial power supply 11 to the power supply 135A. The instruction may instead be the electric power supplied from the power supply 135A to the controller 155A (CPU) after the AC electric power is inputted to the power supply 135A.

The projector 100A includes an image processing system. The image processing system is primarily formed of the controller 155A, which controls and oversees the entire projector 100A, and further includes an image processor 141A, a frame memory 143A, and a storage 151A. The controller 155A, the image processor 141A, and the storage 151A are so connected to each other that data communication can be established among them via the bus 160A.

The frame memory 143A has a storage capacity where image data can be developed, and image data is developed in the frame memory 143A in a process carried out by the image processor 141A. The frame memory 143A can be formed, for example, of an SDRAM (synchronous dynamic random access memory). An SDRAM is a DRAM that reads and writes data in synchronization with a clock.

The image processor 141A reads image data stored in the storage 151A and develops the read image data in the frame memory 143A. The image processor 141A performs image processing on the image data developed in the frame memory 143A. The processing performed by the image processor 141A includes, for example, a resolution conversion (scaling) process or a resizing process, a distortion correction process or any other shape correction process, a digital zooming process, a color tone correction process, and a luminance correction process. The image processor 141A carries out a process specified by the controller 155A and carries out the process as required by using a parameter inputted from the controller 155A. The image processor 141A can, of course, carries out a combination of a plurality of the processes described above. The image processor 141A reads the image data having undergone the image processing from the frame memory 143A and outputs the image data to the light modulator driver 122A.

The storage 151A is an auxiliary storage device, for example, a hard disk drive. The storage 151A may be replaced with a DRAM (dynamic RAM), a flash memory or a CD (compact disc) a DVD (digital versatile disc), a BD (Blu-ray (registered trademark) disc), or any other optical disk, which allow large-capacity information storage. The storage 151A stores a control program executed by the controller 155A and a variety of pieces of data, such as parameters for the image processing performed by the image processor 141A. The storage 151A stores image data to be projected by the projector 100A on the projection surface.

The storage 151A further stores a setting table 153A. In the setting table 153A are registered set periods and identification information that identifies each of the set periods with the set periods and the pieces of identification information related to each other. The setting table 153A and the set periods will be described later in detail.

The storage 151A further stores information on a projection start period of the projector 100A. The projection start period is the period from the time when electric power is supplied to the projector 100A to the time when the projectors 100A start image projection. That is, the projection start period is the period from the time when the instruction is inputted to the projector 100A to the time when the projectors 100A start image projection.

The controller 155A is formed of hardware in the form of a CPU, a ROM, and a RAM (none of them is shown). The ROM is a nonvolatile storage device, such as a flash ROM, and stores a control program and data. The RAM forms a work area used by the CPU. The CPU develops the control programs read from the ROM and the storage 151A in the RAM, executes the developed control programs to control each portion of the projector 100A, and performs the functions of the controller 155A. The CPU may further perform the functions of the light source driver 121A, the light modulator driver 122A, the input processor 133A, and the image processor 141A. A single CPU (or semiconductor chip) may perform the functions of the controller 155A (or functions of the light source driver 121A, the light modulator driver 122A, the input processor 133A, and the image processor 141A in addition to the functions of the controller 155A). Instead, a plurality of CPUs (or semiconductor chips) may perform the functions described above. The controller 155A operates as the "changing section" and the "controller" in an aspect of the invention.

The controller 155A controls each portion of the projector 100A to cause the projector 100A to project the image light on the projection surface. In more detail, the controller 155A causes the image processor 141A to process the image data. In this process, the controller 155A may read a parameter necessary for the processing performed by the image processor 141A from the storage 151A and output the parameter to the image processor 141A.

The controller 155A controls the light modulator driver 122A to cause the liquid crystal panels in the light modulator 112A to draw images. The controller 155A further controls the light source driver 121A to cause it to turn on the light source in the light source section 111A and adjust the luminance of the light emitted from the light source. The light emitted from the light source is thus modulated by the light modulator 112A into image light, and the image light is projected via the projection system 113A on the projection surface.

The display system 1 will be further described.

The projectors 100A, 100B, and 100C are connected to each other only via the duct rail 15, which supplies the projectors 100 with electric power. The projectors 100A, 100B, and 100C therefore cannot each communicate with the other projectors 100 for data transmission/reception.

The projectors 100A, 100B, and 100C vary in terms of performance on an individual projector basis. The projectors 100A, 100B, and 100C can be different-model projectors, and in this case, the difference in the performance among the projectors 100A, 100B, and 100C further increases. The period from the time when the electric power supply to the projectors 100 starts to the time when the projectors 100 are ready for image projection therefore varies among the projectors 100A, 100B, and 100C.

In view of the fact described above, in the present embodiment, the timings when electric power is supplied as the instruction to the projectors 100A, 100B, and 100C are so adjusted that the timings at which the projectors 100 project images are adjusted. Regarding the timings when electric power is supplied as the instruction to the projectors 100, the projectors 100 are connected to the duct rail 15, which is connected to the commercial power supply 11, and the power switch 13 is turned on, whereby the electric power is supplied to the projectors 100 at the same timing.

The projection start period, which is the period from the time when the electric power supply to the projectors 100 starts to the time when the projectors 100 starts image projection, is classified into two periods, an actual startup period and a set period. Out of the two periods, the actual startup period causes the projection start periods of the projectors 100A, 100B, and 100C to differ from one another due to the difference in the performance among the projectors 100A, 100B, and 100C.

The actual startup period is the period spent until a startup process of each of the projectors 100 is completed.

In the startup process, the electric power supply to each of the projectors 100 first starts, and the CPU of the controller 155 is activated and executes the control programs. The electric power is then supplied to the light source section 111 under the control of the CPU, and the temperature of the light source section 111 increases to a temperature higher than a preset temperature so that the amount of light from the light source section 111 exceeds a preset amount of light. The image light is thus ready to be projected. The process described above is the startup process, and the period spent until the startup process is completed is the actual startup period. When the startup process is completed, the projector 100A is ready for image projection. The projectors 100, in a case where the actual startup period is set as the projection start period, each start projecting an image on the projection surface immediately after the startup process is completed.

The set period is the projection start period set by the user and is set to be longer than the actual startup period.

When the electric power supply starts, the projectors 100 each carry out the startup process during the actual startup period described above. When the startup process is completed, the projectors 100 each transitions to a mute state, which is an image projection start standby state, during the set period from which the actual startup period is subtracted (hereinafter referred to as standby period). After the standby period elapses, the projectors 100 each start projecting an image on the projection surface.

For example, assume that the actual startup period of the projector 100A is 4000 ms, and the set period is 7000 ms. In this case, the projector 100A carries out the startup process during the actual startup period of 4000 ms, and when the startup process is completed, the projector 100A waits during the standby period of 3000 ms until the projector 100A is allowed to start image projection. After the standby period of 3000 ms elapses, the projector 100A starts projecting an image on the projection surface.

The projectors 100A, 100B, and 100C each have two action modes, a first mode and a second mode. The first mode is a mode in which the projectors 100 each start projecting an image on the projection surface after the electric power supply to the projectors 100 starts and the set period then elapses. The second mode is a mode in which the projectors 100 each start projecting an image on the projection surface after the electric power supply to the projectors 100 starts and when the actual startup period elapses and the startup process is therefore completed.

Figure 3:
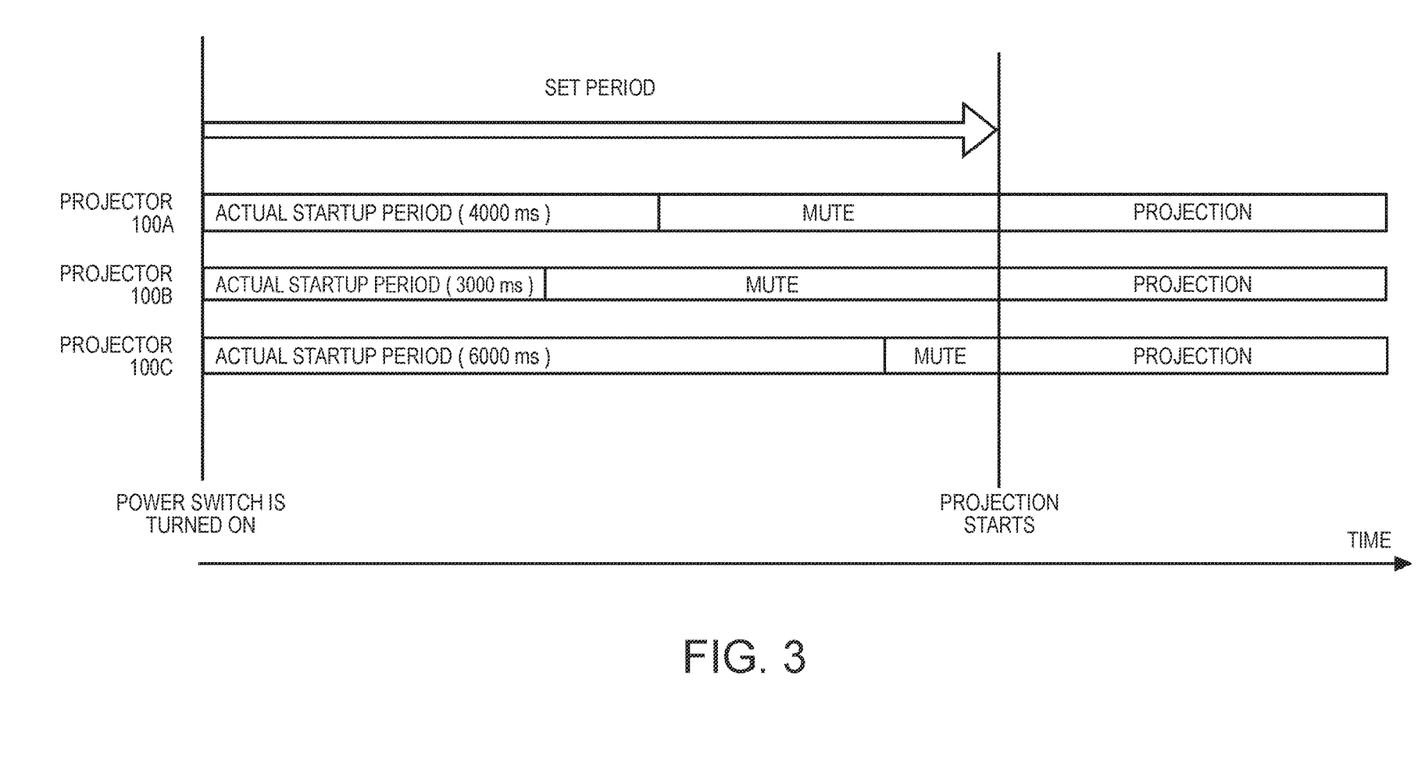
FIG. 3 is a timing chart showing the actions of projectors.

FIG. 3 shows the actions of the projectors 100A, 100B, and 100C after the power switch 13 is turned on.

In the present embodiment, the set period is set in each of the projectors 100 to allow the projection start periods of the projectors 100A, 100B, and 100C agree with one another. In FIG. 3, it is assumed that the actual startup period of the projector 100A is 4000 ms, the actual startup period of the projector 100B is 3000 ms, and the actual startup period of the projector 100C is 6000 ms. It is further assumed that the set period set in each of the projectors 100A, 100B, and 100C is 7000 ms.

When the power switch 13 is turned on and the electric power supply to the projectors 100A, 100B, and 100C starts, the projectors 100 each carry out the startup process during the actual startup period. Since the projector 100B has the shortest actual startup period of 3000 ms, the projector 100B is first ready for projection. Since the actual startup period of the projector 100B is 3000 ms, and the set period is 7000 ms, the projector 100B operates in the mute state, which is the image projection start standby state, for 4000 ms after the projector 100B is ready for projection.

The actual startup period of the projector 100A then elapses. Since the actual startup period of the projector 100A is 4000 ms, the projector 100A completes the startup process in the 4000 ms and then operates in the mute state, which is the image projection start standby state, for 3000 ms.

The actual startup period of the projector 100C then elapses. Since the actual startup period of the projector 100C is 6000 ms, the projector 100C completes the startup process in the 6000 ms and operates in the mute state, which is the image projection start standby state, for 1000 ms.

After the power switch 13 is turned on so that the electric power supply to the projectors 100A to 100C starts and 7000 ms then elapses, the projectors 100A to 100C having operated in the mute state start projecting images on the projection surface. Even the projectors 100 having different projection start periods are allowed to have image projection start periods that accord with one another, whereby the projectors 100A, 100B, and 100C are allowed to projected images at the same time.

In the above description, the set period is set in each of the projectors 100A, 100B, and 100C. Instead, the set period set in the projectors 100A and 100B may be set at 6000 ms, and no set period may be set in the projector 100C. That is, the projectors 100A and 100B are caused to operate in the first mode, and the projector 100C is caused to operate in the second mode. The projector 100C, which operates in the second mode, starts image projection after the actual startup period, in which the startup process is completed, elapses. The projection start periods of the projectors 100A and 100B, in which the set period of 6000 ms is set, is therefore equal to the projection start period of the projector 100C.

Figure 4:
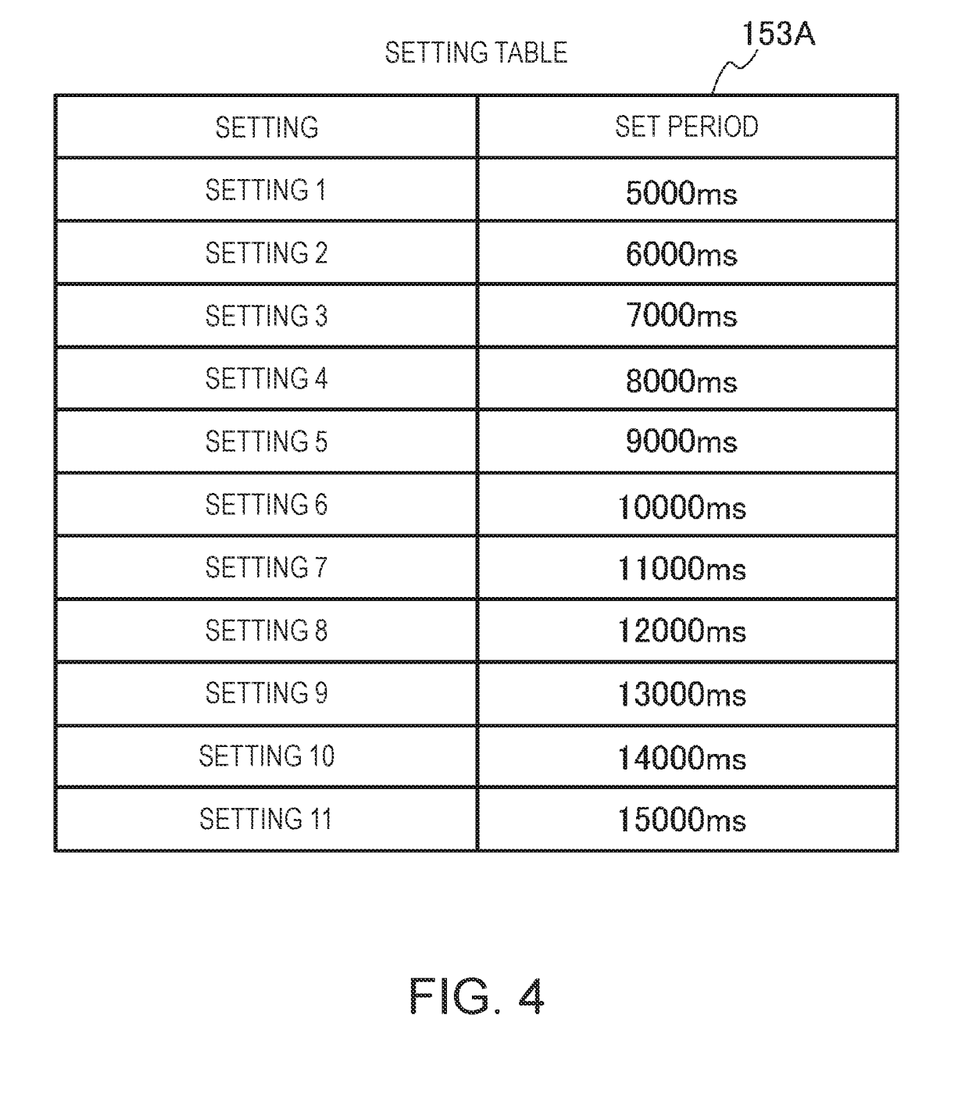
FIG. 4 shows an example of a registration table.

FIG. 4 shows an example of the setting table 153A stored in the storage 151A. FIG. 4 shows an example of the setting table 153A stored in the storage 151A of the projector 100A, and setting tables 153B and 153C are similarly stored in storages 151B and 151C of the projectors 100B and 100C.

In the setting table 153A are registered set periods and identification information that identifies each of the set periods with the set periods and the pieces of identification information related to each other. In the setting table 153A shown in FIG. 4, identification numbers from settings 1 to 11 are registered as the identification information. A period settable as the set period is a period longer than the actual startup period of the projector 100A. For example, in a case where the actual startup period of the projector 100A is 4000 ms, 5000 ms is registered as the setting 1, and set periods are set as the following settings 2 to 11 at intervals of 1000 ms. The set periods registered in the setting table 153A can be changed by the user's operation of the remote control 5.

When the remote control 5 is operated and an operation signal representing a set period setting request is inputted, and in the case where a set period has been set as the projection start period, the controller 155A causes the set period set as the actual startup period to be displayed. The controller 155A further causes the actual startup period and the list of the set periods registered in the setting table 153A to be displayed on the projection surface. In a case where one of the set periods registered in the setting table 153A has been set as the projection start period, this set period may not be displayed. In the case where the actual startup period is set as the projection start period, the controller 155A causes the list of the set periods registered in the setting table 153A to be displayed on the projection surface.

The user operates the remote control 5 to select a period that the user desires to set as the projection start period from the list of the set periods displayed on the projection surface and the actual startup period. When an operation signal representing the period selected as the projection start period is inputted from the input processor 133A, the controller 155A causes the RAM or the storage 151A to store the selected set period as the projection start period.

Further, in a case where information on the actual startup periods of the other projectors, the projectors 100B and 100C, is stored in the storage 151A, the controller 155A may also cause the actual startup periods of the projectors 100A, 100B, and 100C when the controller 155A causes the list of the set periods to be displayed on the projection surface. Displaying the actual startup periods of the projectors 100A, 100B, and 100C can prevent the user from setting a period shorter than the actual startup periods of the other projectors 100.

The actual startup periods of the projectors 100B and 100C may be inputted, for example, by the user's operation of the remote control 5. Further, for example, in a case where the projectors 100A, 100B, and 100C are connected to each other via wires or wirelessly, each of the projectors 100 may notify the other projectors 100 of information on the actual startup period.

In the case where the storage 151A stores the information on the actual startup periods of the projectors 100A, 100B, and 100C, the controller 155A may cause a recommended set period to be displayed on the projection surface when the controller 155A causes the list of set periods to be displayed on the projection surface. For example, the controller 155A causes a period that is longer than the actual startup periods of the projectors 100A, 100B, and 100C but shortest from the start of the electric power supply to be displayed as the recommended set period.

Further, in the present embodiment, the projectors 100A, 100B, and 100C, when they complete the startup processes and are ready for projection, operate in the mute state. In the mute state, a preset image showing the period remaining until the projection start period elapses may be displayed. The user can thus be notified of the period remaining until the projection starts. Further, the projectors 100A, 100B, and 100C may each display a predetermined image, such as a black image, when the projector completes the startup process and is ready for projection.

The projectors 100A, 100B, and 100C may each display, in a case where the projector has failed in starting image projection in the period set as the projection start period (actual startup period or set period), an error message showing that the projector has failed in projecting an image on the projection surface. The display of the error message corresponds to the "preset image" in an aspect of the invention. The user can thus be promptly notified that the image display timing synchronization has failed.

Figure 5:
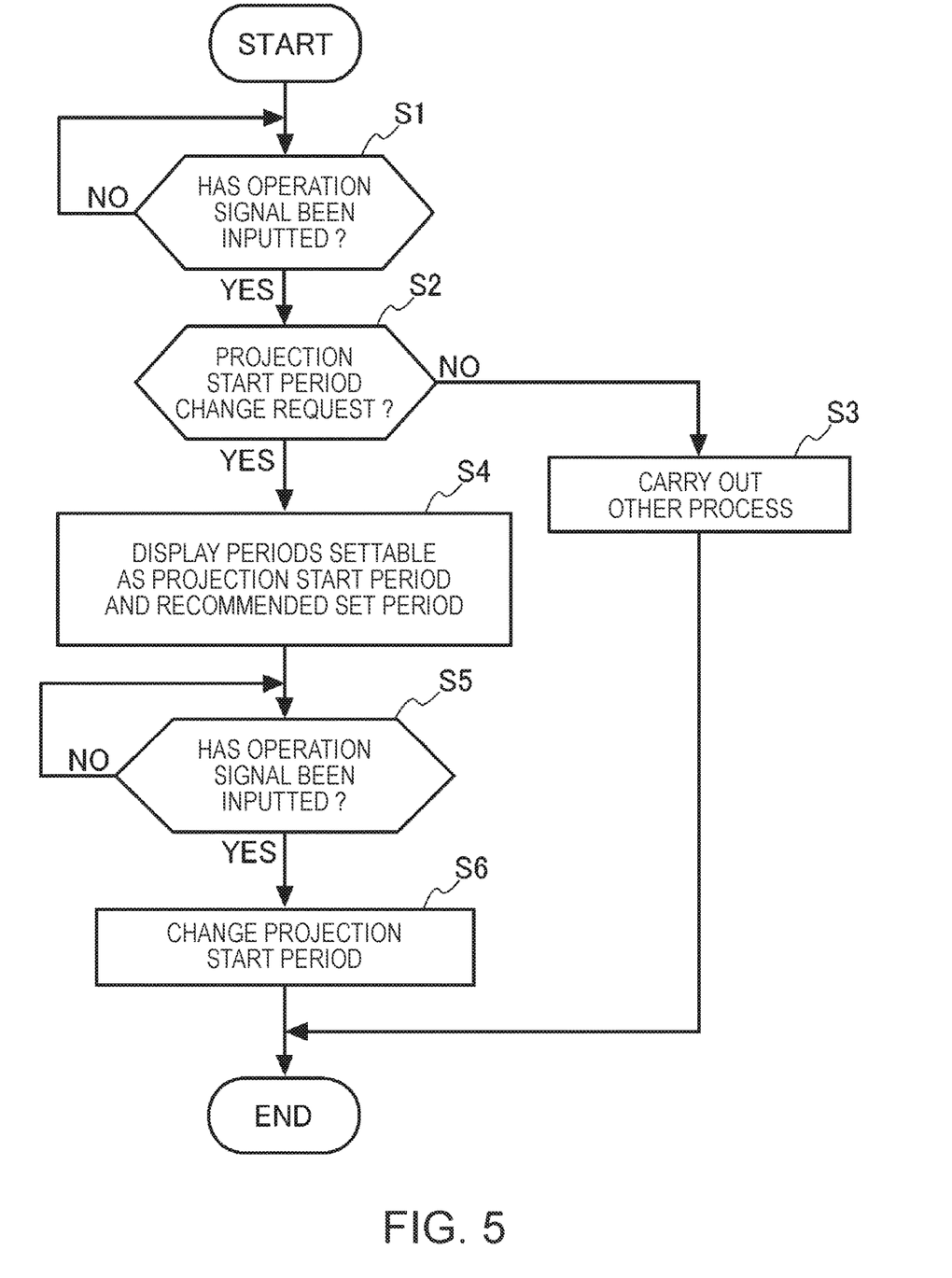
FIG. 5 is a flowchart showing the action of setting a projection start period.

FIG. 5 is a flowchart showing the action of setting the projection start period. The projectors 100A, 100B, and 100C perform the same action in accordance with the flowchart of FIG. 5, and the action of the projector 100A will therefore be described below.

The controller 155A evaluates whether or not an operation signal corresponding to operation performed on the remote control 5 has been inputted from the input processor 133A (step S1). In a case where no operation signal has been inputted (step S1/NO), the controller 155A waits until an operation signal is inputted.

In a case where an operation signal has been inputted (step S1/YES), the controller 155A evaluates whether or not the operation indicated by the operation signal is a projection start period change request (step S2). In a case where the operation is not the projection start period change request (step S2/NO), the controller 155A carries out the process corresponding to the operation indicated by the accepted operation signal (step S3) and terminates the process procedure.

In a case where the operation indicated by the accepted operation signal is the projection start period change request (step S2/YES), the controller 155A causes the period set as the projection start period and the list of periods settable as the projection start period (step S4). The controller 155A may further cause a recommended set period calculated based on the actual startup periods of the projectors 100A, 100B, and 100C to be displayed (step S4). In the case where the information on the actual startup periods of the other projectors 100B and 100C is stored in the storage 151A, the controller 155A determines a recommended set period based on the actual startup periods of the projectors 100A, 100B, and 100C and causes the recommended set period to be displayed on the projection surface.

The controller 155A then evaluates whether or not an operation signal representing a period selected as the projection start period has been inputted (step S5). In a case where no operation signal has been inputted (step S5/NO), the controller 155A waits until an operation signal is inputted. In a case where an operation signal has been inputted (step S5/YES), the controller 155A changes the projection start period in accordance with the inputted operation signal (step S6) and causes the storage 151A to store the new projection start period. In the case where a set period is selected as the projection start period, the selected set period is set as the projection start period. In a case where an operation signal that cancels the set period selection is inputted, the actual startup period is set as the projection start period.

Figure 6:
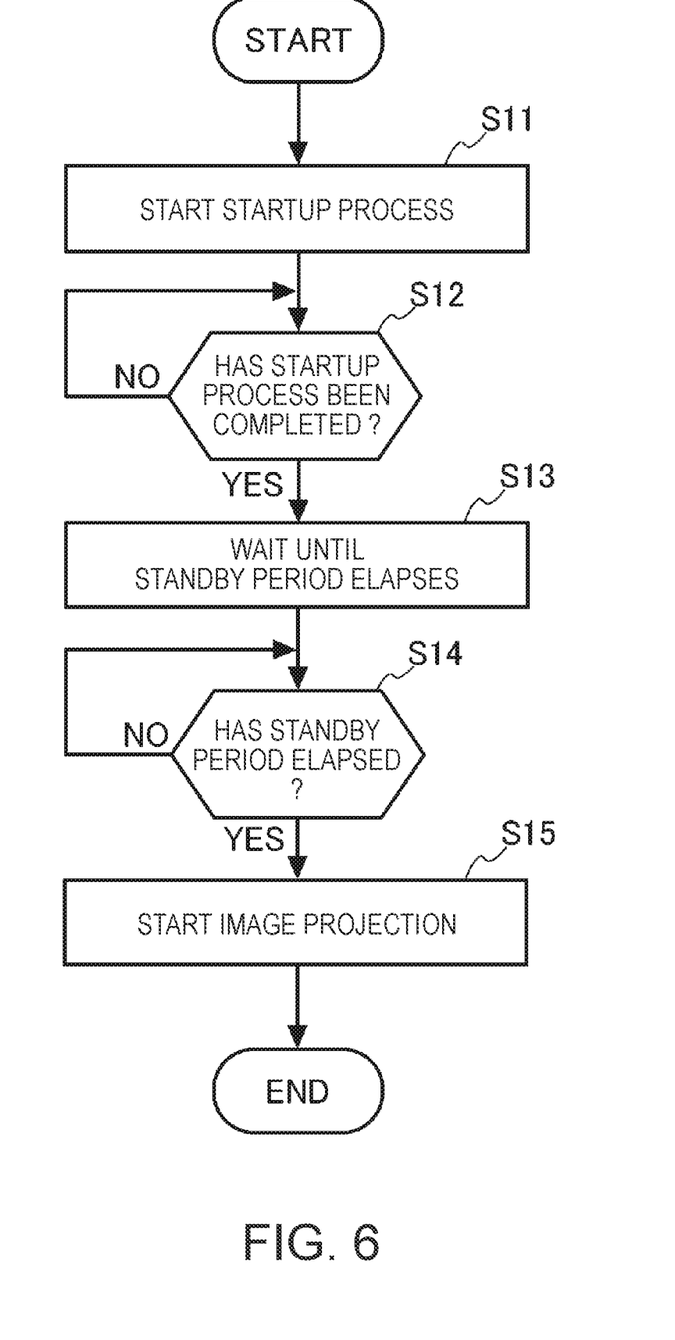
FIG. 6 is a flowchart showing the action of the projector after energized.

FIG. 6 is a flowchart showing the actions of the projectors 100A, 100B, and 100C after the power switch 13 is turned on. Since the projectors 100A, 100B, and 100C perform the same action, the action of the projector 100A will be described below.

When the power switch 13 is turned on and the electric power supply to the projector 100A therefore starts, the controller 155A starts the startup process (step S11). The controller 155A evaluates whether or not the startup process has been completed (step S12), and in a case where the startup process has not been completed (step S12/NO), the controller 155A waits until the startup process is completed (step S12). When the startup process has been completed (step S12/YES), the controller 155A waits for the start of image projection until the standby period elapses (step S13). The controller 155A evaluates whether or not the standby period has elapsed (step S14), and in a case where the standby period has not elapsed (step S14/NO), the controller 155A waits for the start of image projection in the mute state until the standby period elapses. In a case where the evaluation shows that the standby period has elapsed (step S14/YES), the controller 155A starts projecting an image on the projection surface (step S15). The projection start timings of the projectors 100A, 100B, and 100C are thus allowed to coincide with one another, and the images as a whole can be displayed as a single image on the projection surface.

In the embodiment described above, no electric power is first supplied to the projectors 100, and when a preset set period has elapsed since the electric power supply started, the projectors 100 start image projection. As other actions of the projectors 100, the following setting is, for example, conceivable.

For example, the energized state of each of the projectors 100 is set to be a sleep state that allows acceptance of an operation signal from the remote control 5. The sleep state is a state in which no electric power is supplied to part of the configuration of each of the projectors 100 for reduction in the electric power consumed by the projectors 100. The single remote control 5 is configured to be capable of operating all the three projectors 100, the projectors 100A, 100B, and 100C. The projectors 100 are each so set that the projector returns from the sleep state to the image projectable state (normal state) when the projector receives an operation signal transmitted from the remote control 5. The projectors 100, when they receive a preset operation signal, return from the sleep state to the normal state, and the projectors 100, when a preset set period has elapsed since they received the operation signal, start image projection. The setting described above allows the timings when the projectors 100 start image projection to coincide with one another. The plurality of projectors 100 can thus project images as a whole to form a single image.

The above description has been made with reference to the case where the projectors 100 return from the sleep state to the normal state. Instead, the state of each of the projectors 100 before an operation signal is inputted thereto may be the mute state, in which the image projection is allowed but suspended. Further, the remote control 5 may not be used as an operation signal transmitter, and the operation signal may be transmitted, for example, from a mobile terminal, such as a smartphone and a tablet PC, wirelessly connected to each of the projectors 100. In this case, the operation signal transmitted from the remote control 5 or the mobile terminal corresponds to the "instruction" in an aspect of the invention. In the case where the remote control 5 transmits the operation signal, the "remote control light receiver 131A" and the "input processor 133A" operate as the input section in an aspect of the invention. In the case where the mobile terminal transmits the operation signal, a wireless communicator (not shown) that wirelessly communicates with the mobile terminal, such as a smartphone and a tablet PC, operates as the "input section" in an aspect of the invention.

As described above, in the present embodiment, the projectors 100 each include the projection section 110, the power supply 135, the storage 151, the remote control 5, the remote control light receiver 131, the input processor 133, and the controller 155.

The projection section 110 projects an image on the projection surface. The power supply 135 receives electric power supplied as the instruction from the commercial power supply 11 when the power switch 13 is turned on and supplies each portion of each of the projectors 100 with electric power. The storage 151 stores information on the projection start period, which is the period from the time when the electric power supply starts to the time when the projection section 110 starts image projection. The remote control 5, the remote control light receiver 131, and the input processor 133 function as the operation accepting section, which accepts operation. The controller 155 changes the projection start period based on operation accepted by the operation accepting section. The controller 155 causes, when the electric power supply to the projectors 100 starts and after the projection start period elapses, the projection section 110 to project an image.

The points of time when the projectors 100 start image projection can therefore be set with respect to the timing when the electric power is supplied to the power supply 135. For example, to cause the plurality of projectors 100 to project images, the same set period is set in the plurality of projectors 100, and the timing when the instruction is inputted to each of the plurality of projectors 100 is adjusted. The timings when the plurality of projectors 100 project images are thus allowed to coincide with one another. The image projection timings can therefore be adjusted in the simple configuration.

The controller 155 causes the projection section 110 to display a predetermined image after the electric power supply to the power supply 135 starts but before the set period elapses.

The preset image is therefore displayed until the image projection starts, whereby the user can be notified that the image projection has not started.

The controller 155 further causes an image showing the period remaining until the projection section 110 starts image projection to be displayed as the preset image.

The user can therefore recognize the period remaining until the image projection starts.

The controller 155, when it accepts operation from the remote control 5, causes the projection section 110 to display an image showing the set period.

The user can therefore recognize the set period having been set.

The controller 155 causes, after the set period elapses but when the projection section 110 fails in projecting an image, causes an image showing that the image projection has failed to be displayed.

The user can therefore be notified that the image projection has not started.

The controller 155 switches the action mode between the first mode and the second mode and performs image projection in one of the two modes. The first mode is a mode in which the projection section 110 starts image projection after the electric power supply to the power supply 135 starts and the set period then elapses. The second mode is a mode in which the projection section 110 starts image projection after the electric power supply to the power supply 135 starts irrespective of whether or not the set period elapses.

Therefore, in the first mode, the projection section 110 is allowed to start image projection after the set period elapses, and in the second mode, the projection section 110 is allowed to start image projection before the set period elapses. Therefore, the first mode, which allows the image projection timing to synchronize with those of the other projectors, and the second mode, which allows image projection to start with no image projection timing synchronization, can be switched from one to the other, and the image projection can be performed in the selected mode.

The embodiment described above is a preferable embodiment of the invention. It is, however, noted that the invention is not limited to the embodiment described above, and that a variety of variations are conceivable to the extent that the variations do not depart from the substance of the invention.

For example, the above embodiment has been described with reference to the case where an image is projected on the projection surface based on image data stored in the storage 151. Instead, the projectors 100 may process image data supplied from an external image supplier and cause the processed image data to be projected on the projection surface. Further, the above embodiment has been described with reference to the case where the remote control 5 is used to change the set period. Instead, the set period may be changed based on an operation signal transmitted from a PC or any other terminal connected via a communicator.

The above embodiment has been described with reference to the case where the projectors 100A and 100B are each a liquid crystal projector using transmissive liquid crystal panels. The projectors 100A and 100B may instead each be a projector using reflective liquid crystal panels or digital mirror devices.

Each of the functional portions of the projector 100A shown in FIG. 2 represents a functional configuration achieved by cooperation between hardware and software and is not necessarily implemented in a specific form. Therefore, hardware corresponding to each of the functional portions is not necessarily implemented, and a single processor that executes a program can, of course, achieve the functions of the plurality of functional portions. Further, part of the functions achieved by software in the embodiment described above may be achieved by hardware, or part of the functions achieved by hardware may be achieved by software.

The process units in the flowcharts shown in FIGS. 5 and 6 are those divided in accordance with primary processing contents for ease of understanding of the entire process carried out by the controller 155. The invention is not limited by how to produce the divided process units or the name thereof shown in the flowcharts of FIGS. 5 and 6. In accordance with the process contents, the entire process carried out by the controller 155 may be divided into a greater number of process units, or one process unit may further be divided into a large number of processes. The order in which the process units in the flowcharts described above are carried out is not limited to the order in the illustrated example.

What is claimed is:

1. A display apparatus comprising:
a display section that displays an image;
an input section to which an instruction for displaying the image is inputted;
a storage that stores a set period that is a period from a point of time when the instruction is inputted to the input section to a point of time when the display section displays the image;
an operation accepting section that accepts operation;
a changing section that changes the set period based on the operation accepted by the operation accepting section; and
a controller that causes the display section to display the image after the instruction is inputted to the input section and the set period stored in the storage then elapses, wherein the controller switches a first mode in which the display section displays the image after the instruction is inputted to the input section and the set period then elapses to a second mode in which the display section displays the image when the instruction is inputted to the input section irrespective of whether or not the set period elapses and vice versa, and the controller causes the display section to display the image in the selected mode.

2. The display apparatus according to claim 1, wherein the controller causes the display section to display a preset image after the instruction is inputted to the input section but before the set period elapses.

3. The display apparatus according to claim 2, wherein the controller causes an image showing a period remaining until the display section displays the image to be displayed as the preset image.

4. The display apparatus according to claim 1, wherein the controller causes the display section to display an image showing the set period when the operation accepting section accepts the operation.

5. The display apparatus according to claim 1, wherein the controller causes the display section to display an image showing that the image cannot be displayed in a case where the display section fails in displaying the image after the set period elapses.

6. A display system comprising a first display apparatus and a second display apparatus,
wherein the first display apparatus and the second display apparatus each include
a display section that displays an image,
an input section to which an instruction for displaying the image is inputted,
a storage that stores a set period that is a period from a point of time when the instruction is inputted to the input section to a point of time when the display section displays the image,
an operation accepting section that accepts operation,
a changing section that changes the set period based on the operation accepted by the operation accepting section, and
a controller that causes the display section to display the image after the instruction is inputted to the input section and the set period stored in the storage then elapses, and
a timing when the instruction is inputted to the input section provided in the first display apparatus and a timing when the instruction is inputted to the input section provided in the second display apparatus are so adjusted that a timing when the first display apparatus displays the image and a timing when the second display apparatus displays the image are adjusted,
wherein the first display apparatus and the second display apparatus are connected to a common power supply line,
the power supply line is provided with a switch that is so turned on and off as to allow and prevent electric power supply, and
the instruction is inputted to the input sections provided in the first display apparatus and the second display apparatus at a timing when the switch is turned on.

7. A method for controlling a display apparatus including a display section that displays an image, an input section to which an instruction for displaying the image is inputted, and a storage that stores a set period that is a period from a point of time when the instruction is inputted to the input section to a point of time when the display section displays the image, the method comprising:
changing the set period stored in the storage based on operation accepted by an operation accepting section; and
causing the display section to display the image after the instruction is inputted to the input section and the set period stored in the storage then elapses, wherein a first mode is switched to in which the display section displays the image after the instruction is inputted to the input section and the set period then elapses to a second mode in which the display section displays the image when the instruction is inputted to the input section irrespective of whether or not the set period elapses and vice versa, and the controller causes the display section to display the image in the selected mode.

8. The method according to claim 7, wherein the instruction is provided at a time when electric power is switched on to the display apparatus.

9. The method according to claim 7, wherein when the set period is set, the set period is stored in a plurality of display apparatuses.

10. The display apparatus according to claim 1, wherein the instruction is provided at a time when electric power is switched on to the display apparatus.

11. The display system according to claim 6, wherein the instruction is provided at a time when electric power is switched on to the display apparatus.

12. The display apparatus according to claim 1, wherein when the set period is set, the set period is stored in a plurality of display apparatuses.

13. The display system according to claim 6, wherein when the set period is set, the set period is stored in a plurality of display apparatuses.

* * * * *